March 2, 1937.  W. M. BRALY  2,072,356
FLUID MOTOR FOR A POWER TRANSMISSION MECHANISM
Filed July 14, 1934   4 Sheets-Sheet 1
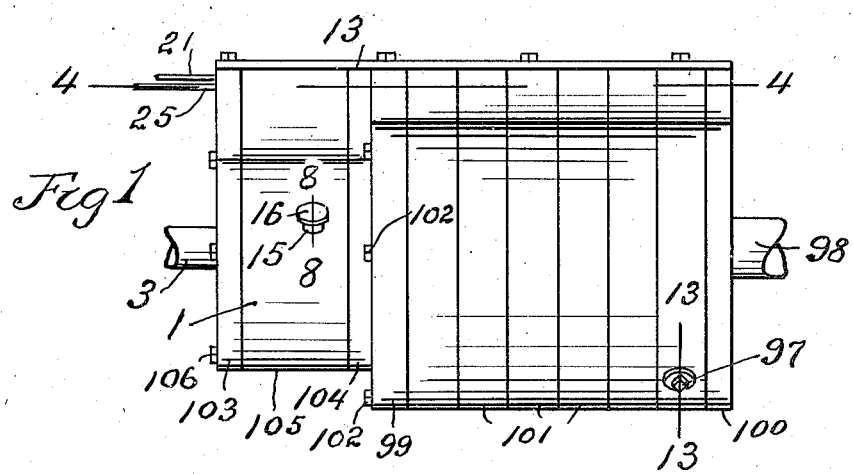
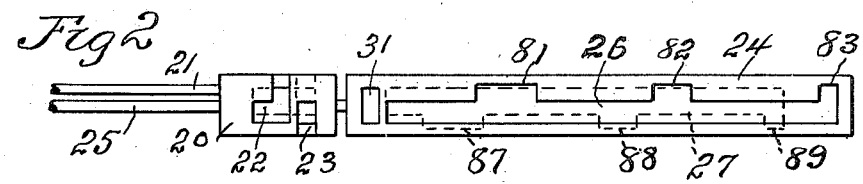
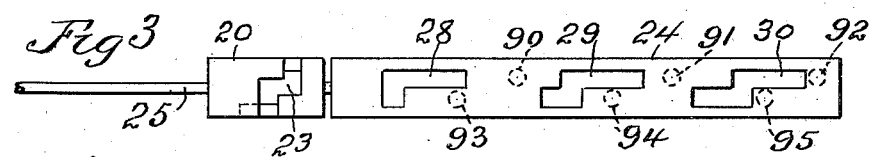
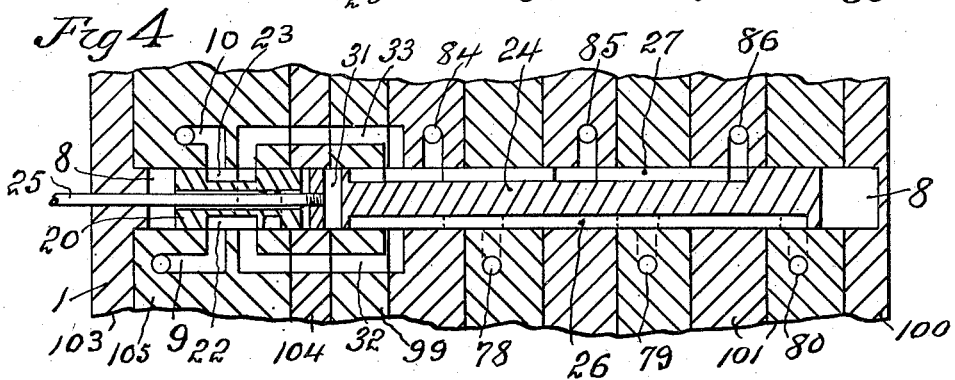
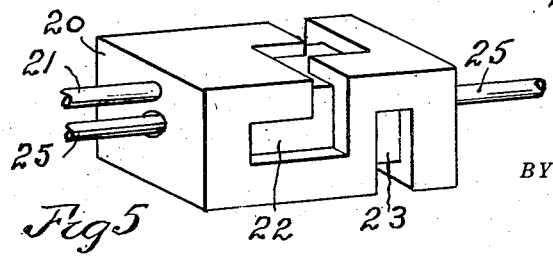
INVENTOR
Walter M. Braly
Warren D. House
BY
His ATTORNEY March 2, 1937. W. M. BRALY 2,072,356
FLUID MOTOR FOR A POWER TRANSMISSION MECHANISM
Filed July 14, 1934 4 Sheets-Sheet 2
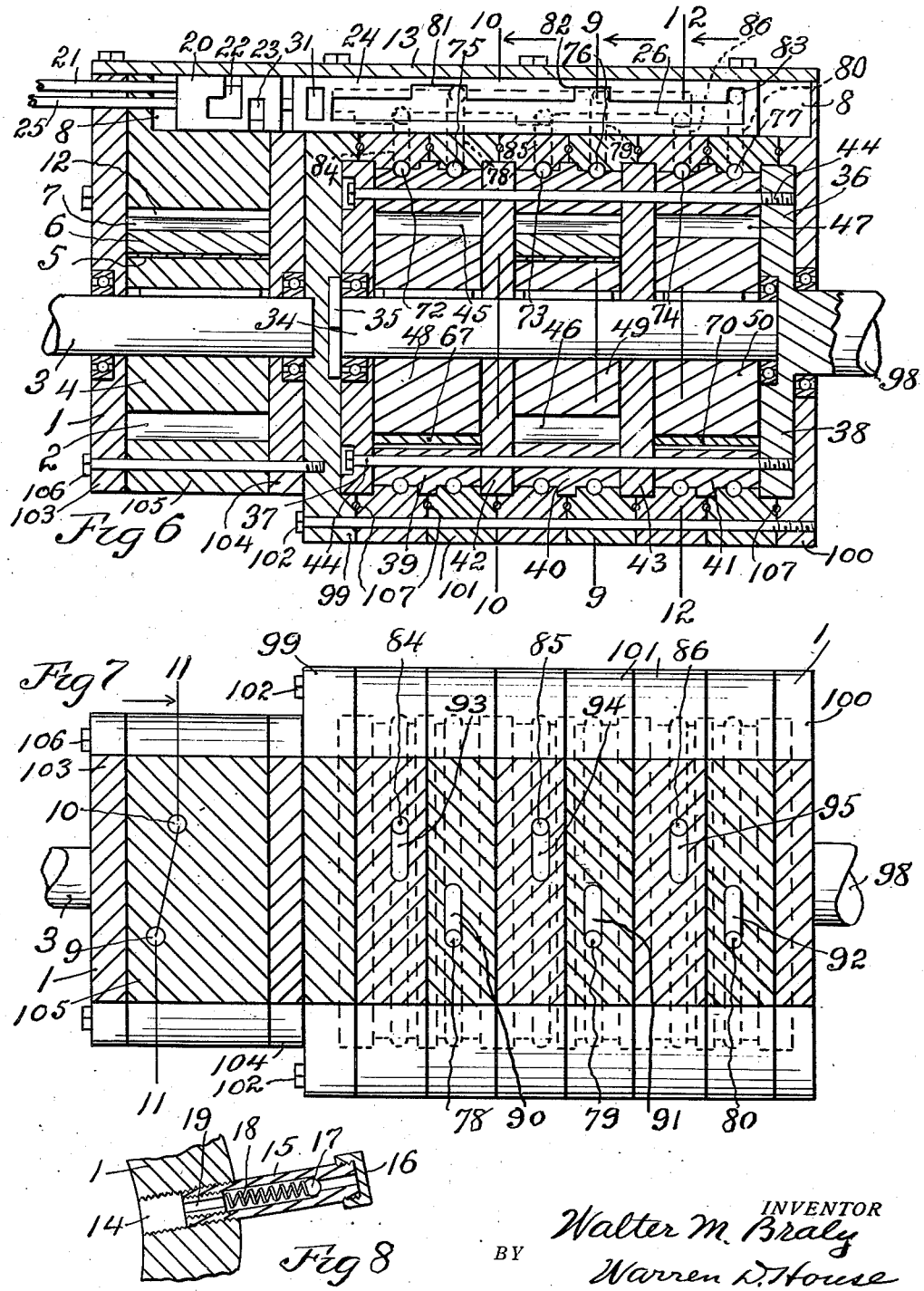
INVENTOR
Walter M. Braly
BY
Warren D. House
His ATTORNEY

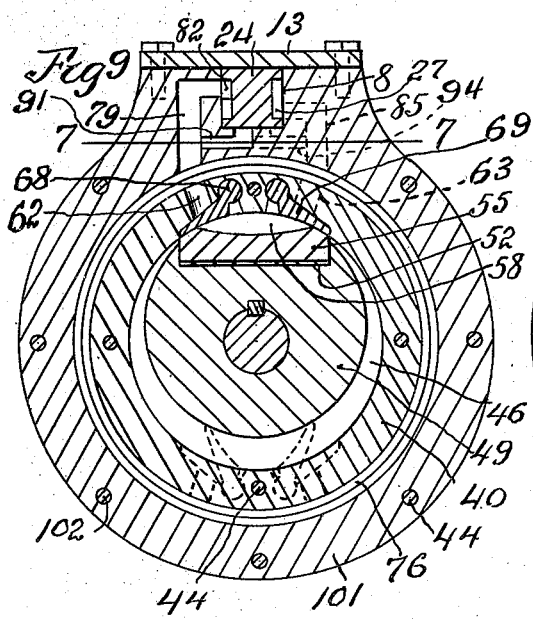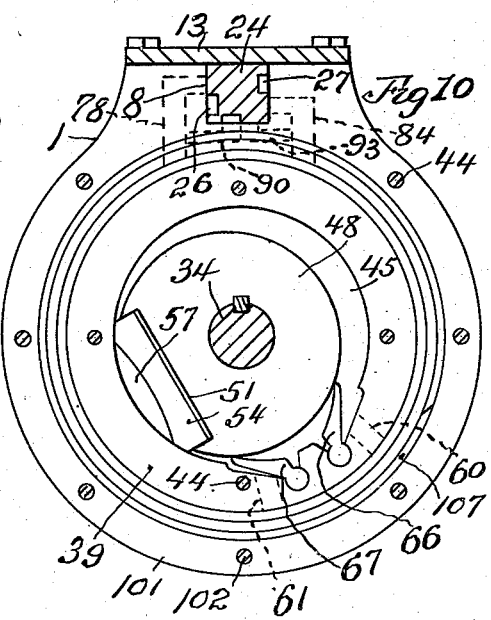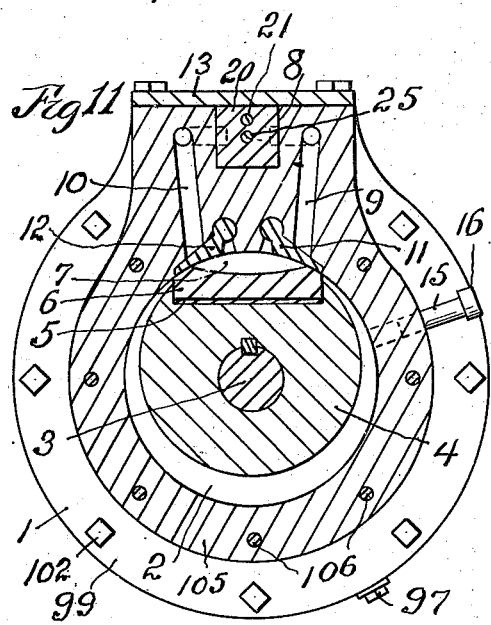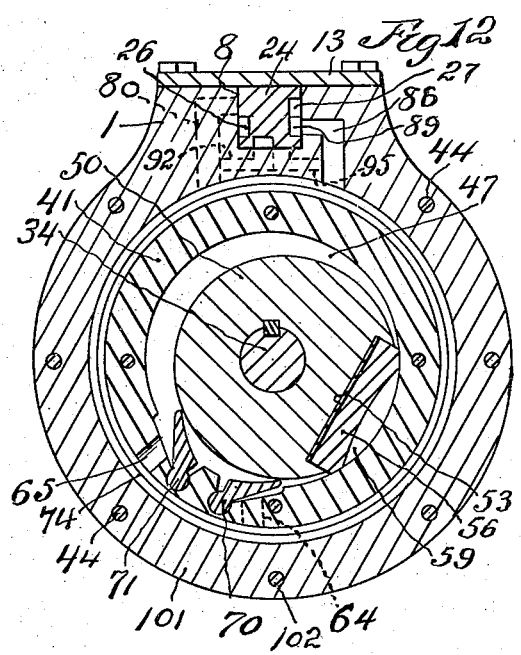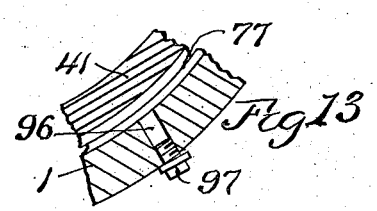

March 2, 1937.   W. M. BRALY   2,072,356
FLUID MOTOR FOR A POWER TRANSMISSION MECHANISM
Filed July 14, 1934   4 Sheets-Sheet 4
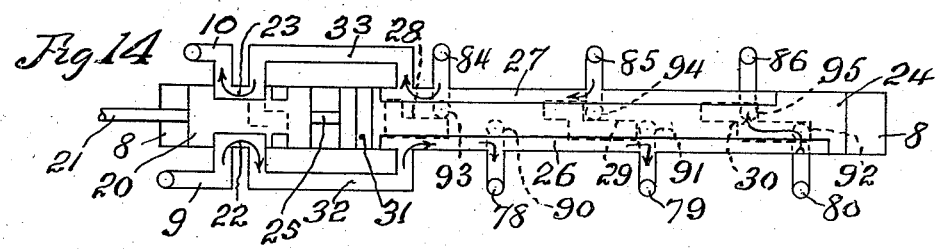
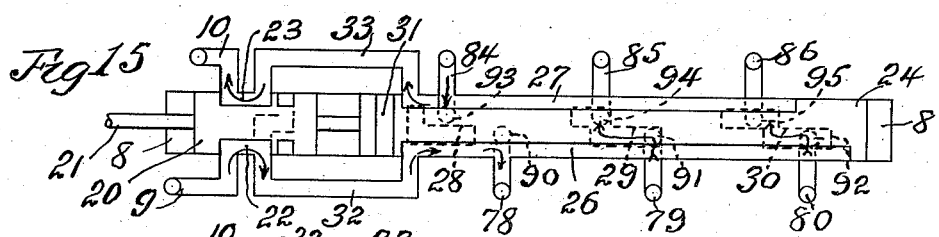
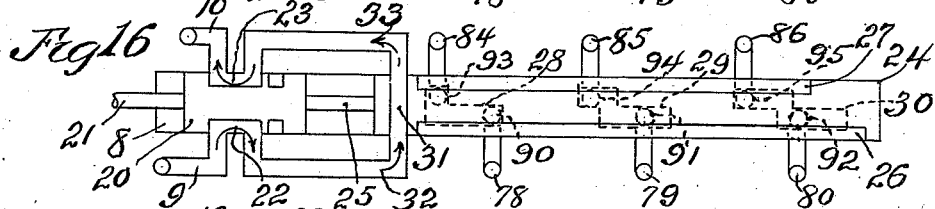
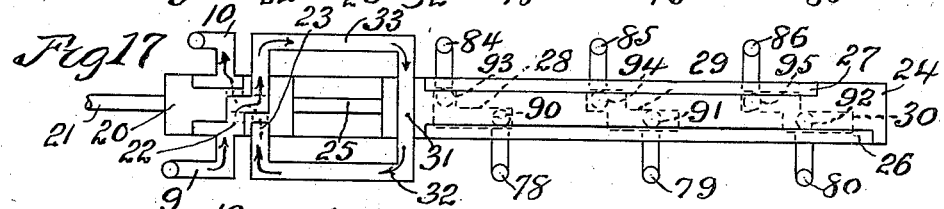
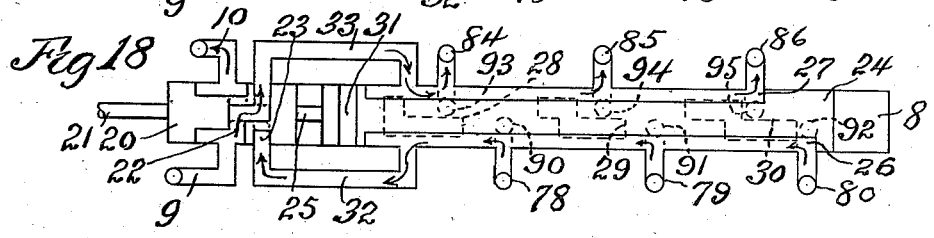
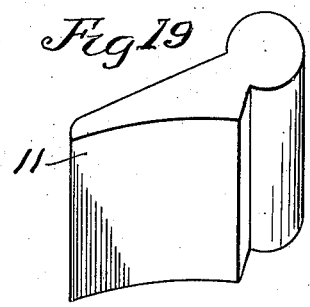
INVENTOR
Walter M. Braly
BY Warren D. House
His ATTORNEY Patented Mar. 2, 1937

2,072,356

UNITED STATES PATENT OFFICE 2,072,356

FLUID MOTOR FOR A POWER TRANSMISSION MECHANISM

Walter M. Braly, Louisburg, Kans.

Application July 14, 1934, Serial No. 735,243

15 Claims. (Cl. 121—96)

My invention relates to improvements in power transmission mechanisms in which the power transmission is effected by means of fluid, preferably oil.

My improved transmission is adapted for use on an automobile for transmitting power from the engine to the driving shaft in lieu of the usual shifting gear mechanism, or for the transmission of power at different speeds, for many other purposes.

One of the objects of my invention is to provide in a transmission mechanism of the kind described a structure which is simple, strong, durable, not likely to get out of order, which may be readily applied as a substitute for the usual clutch, gear transmission and gear shifting mechanism, and which is efficient in its operation.

The novel features of my invention are hereinafter fully described and claimed.

In the accompanying drawings which illustrate the preferred embodiment of my invention, Fig. 1 is a reduced side elevation, partly broken away, of my improved transmission mechanism.

Fig. 2 is an enlarged side elevation of the two valves which control the direction of flow of the operating fluid.

Fig. 3 is an enlarged bottom view of what is shown in Fig. 2.

Fig. 4 is an enlarged section on the line 4—4 of Fig. 1.

Fig. 5 is an enlarged perspective view of one of the slide valves and part of the stem of the other slide valve.

Fig. 6 is an enlarged central vertical longitudinal sectional view, partly broken away, of my improved mechanism.

Fig. 7 is a horizontal section on the plane of the line 7—7 of Fig. 9.

Fig. 8 is an enlarged section on the line 8—8 of Fig. 1, showing the valve controlled filling tube.

Fig. 9 is a section on the line 9—9 of Fig. 6.

Fig. 10 is a section on the plane of the line 10—10 of Fig. 6, the adjacent partition being omitted.

Fig. 11 is a section on the line 11—11 of Fig. 7.

Fig. 12 is a section on the line 12—12 of Fig. 6.

Fig. 13 is a section on the line 13—13 of Fig. 1, showing the plugged drain outlet of the pump.

Fig. 14 is a diagrammatic view of the valves and oil conducting passages, showing the valves as disposed when the two left chambers are connected with the pump and the right chamber disconnected therefrom and by-passing its fluid.

Fig. 15 is a view similar to Fig. 14, showing the positions of the valves when the two right chambers are by-passing and the left chamber is connected with the pump.

Fig. 16 is a view similar to Fig. 14, showing the positions of the valves when the pump is by-passing and all of the chambers are disconnected from the pump and by-passing.

Fig. 17 is a view similar to Fig. 14, showing the positions of the valves when the valves are in reverse and the pump is by-passing, and all of the chambers are disconnected from the pump and by-passing.

Fig. 18 is a view similar to Fig. 14, showing the valves in the positions occupied by them when in reverse and all of the chambers are connected with the pump.

Fig. 19 is an enlarged perspective of one of the pivoted sealing members.

Similar characters of reference designate similar parts in the different views.

1 designates a casing having a chamber 2 through which extends a horizontal shaft 3 rotatable in the casing 1 and adapted to be an engine driven shaft, or a shaft driven by any other means.

Keyed on the shaft 3 and revolubly fitted eccentrically in the chamber 2 and on the shaft 3 is a piston 4, Figs. 6 and 11.

That portion of the periphery of the piston 4 which is closely adjacent to the inner wall of the chamber 2, is transversely grooved its full width, and fitted in the groove is a shim plate 5 on which rests a removable block 6 which has in its upper side a concave groove 7. The block 6 at the side edges of the groove 7 has traveling engagement with the inner wall of the chamber 2.

In the upper part of the casing 1 is provided a longitudinal groove 8, which is rectangular in cross section and is closed at its ends and extends above the chamber 2, Figs. 4 and 6. Communicating at their upper ends with opposite sides of the groove 8 are two passages for fluid the lower ends of which are adapted to communicate with the chamber 2 and with the groove 7, when the piston 4 revolves in the chamber 2, said passages being designated 9 and 10.

Sealing means are provided comprising two wings 11 and 12, each of which is represented in Fig. 19, pivotally mounted at their upper partially cylindrical edges in the casing 1 between the passages 9 and 10, and extending oppositely downwardly across the passages 9 and 10 and bearing on the block 6 at opposite sides of the groove 7, when the piston 4 is in the position shown in Fig. 11.

When the piston 4 revolves, the wings 11 and 12 will have traveling engagement with the periphery of the piston, thus preventing the fluid passing directly from one of the passages 9 and 10 through the chamber 2. As the piston 4 is revolved counter-clockwise, as viewed in Fig. 11, fluid will enter the chamber 2 through the passage 10 and will be discharged through the passage 9.

The casing 1 has removably fastened to its upper side a cover 13 which closes the upper side of the groove 8.

For inserting fluid, such as oil, into the chamber 2, the casing 1 is provided with a threaded passage 14, Figs. 1 and 8, which communicates with the chamber 2 and has fitted in it a filling tube 15 having at its outer end a threaded removable cap 16. An inwardly opening ball valve 17 is held against a seat in the tube 15 by a coil spring 18 which bears at its inner end against a tube 19 fitted in the internally threaded end of the tube 15.

For providing a cushioning effect, when the chamber 2 is provided with oil, a small amount of air is permitted to remain in the filling tube 15 and the passage 14.

Longitudinally slidably adjustably fitted in the groove 8 is a valve 20, which is rectangular in cross section, and which has attached to one end a stem 21 which extends through the adjacent end of the casing 1, and with which the valve 20 may be adjusted to its different operative positions. The valve 20 has a passage 22 in one side which extends zigzag across the top of the valve and into the opposite side of the valve. The valve is provided with another passage 23 which extends from one side and zigzags across the bottom of the valve and into the opposite side, Figs. 2, 3, 4, and 5.

Alined in the groove 8 with the valve 20 is another valve 24 rectangular in cross section and longitudinally slidably adjustably fitted in the groove 8, and which is provided at one end with an operating stem 25 which extends longitudinally through and is movable lengthwise in the valve 20 and the casing 1. Two longitudinal passages 26 and 27 are respectively provided in opposite sides of the valve 24. The under side of the valve 24 is provided with three angular by-pass passages 28, 29 and 30, Figs. 3 and 14 to 18. In Fig. 2, the side passages 26 and 27 are shown in solid and dotted lines respectively. They are also shown in Figs. 4, 6, 9, 10, 11 (dotted), 12 and 14 to 18.

As shown in Figs. 2, 4, and 6, the valve 24 is provided near the end thereof adjacent to the valve 20 with a transverse passage 31 therethrough.

The casing 1 is provided at opposite sides respectively of the groove 8 with two horizontal longitudinal U shaped passages 32 and 33. One end of the passage 32 is adapted to selectively register with the passages 22 and 23 of the valve 20, and the other end of the passage 32 is adapted to selectively register with the passages 26 and 31.

One end of the passage 33 is adapted to selectively register with the passages 23 and 22 of the valve 20, and its other end is adapted to register with the passages 27 and 31.

In the casing 1 alined with the shaft 3 is a shaft 34, Fig. 6, which has a squared head 35 fitted in the casing and which holds the shaft 34 from revolving.

Concentric with the shaft 34 and revoluble thereon in the casing 1 is a cylinder generally designated by 36, and which, as shown, comprises two end plates 37 and 38; three cylindrical members 39, 40, and 41 which are annular and concentric with the shaft 34, and are disposed spaced apart in a row; two partition plates 42 and 43, and bolts 44. The annular members 39 and 41 are disposed respectively against the end plates 37 and 38, and the annular member 40 is disposed between the partitions 42 and 43 which respectively bear against the annular members 39 and 41. The bolts 44 extend through the plates 37 and 38, the annular members 39, 40 and 41 and the partition plates 42 and 43 and hold the cylinder parts firmly together.

Respectively in the annular members 39, 40, and 41 are chambers 45, 46, and 47, in which are respectively eccentrically disposed three cylindrical stationary pistons 48, 49, and 50 keyed on the stationary shaft 34 and the ends of which are closely fitted against the ends of the chambers in which they are respectively disposed.

The pistons 48, 49, and 50 are each transversely grooved in its periphery, and in the grooves are respectively mounted shim plates 51, 52, and 53, on which are respectively mounted blocks 54, 55, and 56, each having in its upper side a transverse arcuate groove, said grooves being designated by 57, 58, and 59. The blocks 54, 55, and 56 at the side edges of the said grooves respectively have traveling engagement with the inner walls of the annular cylinder members 39, 40, and 41.

The pistons are disposed in different circumferential positions on the shaft 34, preferably with the radial centers of the blocks 54, 55, and 56 disposed spaced about 120 degrees apart, as shown in Figs. 10, 9, and 12.

The annular cylinder member 39 is provided with two radial ports 60 and 61 disposed respectively in different transverse planes, Fig. 10. The annular member 40 is provided with two radial ports 62 and 63, and the member 41 is provided with two ports 64 and 65, the ports 62 and 63, and the ports 64 and 65 being disposed respectively as are the ports 60 and 61, Figs. 9 and 12.

Sealing means comprising two wings 66 and 67, each corresponding in shape to what is shown in Fig. 19, are pivoted at their adjacent partially cylindrical edges in the annular cylinder member 39, between the ports 60 and 61, and extend in opposite directions across the ports 60 and 61 respectively, and are adapted to have traveling engagement with the periphery of the piston 48, as shown in Fig. 10.

Similarly pivoted in the annular cylinder member 40 between the ports 62 and 63 and adapted for traveling engagement with the periphery of the piston 49, are two wings 68 and 69, Fig. 9.

Two wings 70 and 71, corresponding to the wings 66 and 67, are pivoted in the annular cylinder member 41 between the ports 64 and 65 and are adapted for traveling engagement with the periphery of the piston 50, Fig. 12.

Respectively encircling the chambers 45, 46, and 47 between the casing 1 and the annular cylinder members 39, 40 and 41, are annular ducts 72, 73, and 74, which respectively are in constant communication with the ports 61, 63, and 65.

Also respectively encircling the chambers 45, 46, and 47 between the casing 1 and the cylinder members 39, 40, and 41, are annular ducts 75, 76, and 77, which are respectively in constant communication with the ports 60, 62, and 64.

In the casing 1 are passages 78, 79, and 80, which respectively communicate with the ducts 75, 76, and 77. The other ends of the passages 78, 79, and 80 terminate at the left side of the groove 8, as viewed in Figs. 10, 9 and 12, and are adapted to be closed by the valve 24, and also to respectively communicate with recesses 81, 82, and 83 in the upper part of the passage 26 in the valve, Figs. 2 and 6.

In the casing 1 are passages 84, 85, and 86 which respectively communicate with the ducts 72, 73, and 74, and which terminate at the right side of the groove 8, as viewed in Figs. 10, 9, and 12, and are adapted to be closed by the valve 24, and also to respectively communicate with recesses 87, 88, and 89 in the lower side of the passage 27 in the valve 24, Fig. 2.

Branch passages 90, 91, and 92 extend respectively from the passages 78, 79, and 80 to the bottom of the groove 8, and are adapted to communicate respectively with the angular by-passages 28, 29, and 30 in the under side of the valve 24, Figs. 3, 9, 10, and 12.

Similar branch passages 93, 94, and 95 extend respectively from the passages 84, 85, and 86 to the bottom of the groove 8, and are adapted to communicate respectively with the by-passages 28, 29, and 30, Figs. 3, 9, 10, and 12.

As shown in Figs. 1 and 13, the casing 1 has a drain passage 96 which extends from the lower part of the duct 77 to the atmosphere, which passage is normally closed by a removable screw plug 97.

The end plate 38 of the cylinder 36 is provided with an axial shaft extension 98, which may be employed as a driving shaft for any desired purpose, as for driving the carrying wheels of an automobile.

Assuming that the engine, or other power, revolves the shaft 3 counter clock-wise, as viewed in Fig. 11, the piston 4 will force fluid, as oil, which is in the chamber 2, therefrom into the passage 9, the wing 11 opening when the block 6 passes from thereunder.

If it is desired to drive the shaft 98 and the cylinder 36 in the same direction as the shaft 3, the operator sets the valves 20 and 24, if it is desired to have the propelling fluid enter all of the chambers 45, 46 and 47 of the cylinder 36, in the positions shown in Fig. 4. The fluid will then pass from the passage 9 into the valve passage 22, Fig. 4, thence into and through the passages 32 and 26, and from the latter passage, the fluid will pass by the passages 78, 79, and 80 into the ducts 75, 76, and 77, and from thence respectively through the ports 60, 62, and 64 into the chambers 45, 46, and 47 of the cylinder 36. The cylinder 36 will thus be revolved clock-wise, as viewed in Figs. 9, 10, and 12, and the fluid will pass from the chambers 45, 46, and 47 by the ports 61, 63, and 65 respectively into and through the passages 84, 85, and 86 into the passage 27 of the valve 24, and from thence through the passage 33, valve passage 23 and passage 10 back into the chamber 2 of the pump.

If it is desired to increase the speed of the shaft 98, the valve stem 25 is operated to move the valve 24 to the position shown in Fig. 14, in which position the valve 24 will disconnect the passages 80 and 86 from the passages 26 and 27, and will connect the branch passages 92 and 95 with each other through the angular passage 30 in the under side of the valve 24.

The fluid will then revolve the cylinder 36 through the intermediacy of the chambers 45 and 46, the chamber 47 having been disconnected from the pump, as shown in Fig. 14. As the cylinder is being revolved, the oil in the chamber 47 will be by-passed through the port 65, duct 74, passages 86, 95, 30, 92, and 80, duct 77 and port 64 back to the chamber 47.

If it is desired to further increase the speed of the shaft 98, the valve 24 is moved to the position shown in Fig. 15, the valve 20, being left in the same position as it was, and as shown in Figs. 14 and 4. The valve 24 will now cut off the chamber 46 as well as the chamber 47. The chamber 47 will have its oil by-passed, in the manner just before described, and the chamber 46 will have its oil by-passed through the port 63, duct 73, passages 85, 94, 29, 91, and 79, duct 76 and port 62 back to chamber 46.

If it is desired to stop rotation of the shaft 98 while retaining rotation of the pump shaft 3 and piston 4, the valve 20 is left in the position shown in Figs. 4, 14, and 15, and the valve 24 is shifted to the position shown in Fig. 16, in which position the passages 32 and 33 will connect with the transverse passage 31 in the valve 24, whereupon the oil will pass from the pump chamber 2 through the passages 9, 22, 32, 31, 33, 23, and 10 back to the chamber 2, and the valve 24 will cut off the passages 78, 79, and 80 from the passage 26, and the passages 84, 85, and 86 from the passage 27.

The chambers 46 and 47 will be by-passed, in the manner already described, and the chamber 45 will be by-passed through the port 61, duct 72, passages 84, 93, 28, 90, and 78, duct 75 and port 60 back to chamber 45, and the cylinder 36 will stop revolving through power from the pump.

The direction or rotation of the shaft 98 may then be reversed by shifting the valve 20 from the position shown in Figs. 4, 14, 15, and 16 to the position shown in Fig. 17, in which position the passage 32 will connect with the passages 23 and 31, and the passage 33 will connect with the passages 22 and 31.

In the position shown in Fig. 17, the direction of flow will be reversed through the U shaped passages 32 and 33 from that shown in Fig. 16, and the chambers 45, 46, and 47 will be by-passed through the passages 28, 29, and 30 in the bottom of the valve 24.

If now the valve 24 be shifted to the position shown in Fig. 18, it will be in the initial position, shown in Fig. 4, and the flow of oil will pass from the pump through the passages 9, 22, 33, and 27, and from the latter will be divided through the chambers 45, 46, and 47 in direction the reverse of that described with relation to the positions of the valves 20 and 24, as shown in Fig. 4. The flow will pass from the passage 27 in the valve 24 through the passage 84, duct 72, port 61, chamber 45, port 60, duct 75, and passage 78 to the valve passage 26. The flow will pass from the passage 27 through the passage 85, duct 73, port 63, chamber 46, port 62, duct 76, and passage 79 to the valve passage 26. The flow will pass from the passage 27 through the passage 86, duct 74, port 65, chamber 47, port 64, duct 77, and passage 80 into the valve passage 26.

The flow will pass from the valve passage 26 through the U shaped passage 32, passage 23 and passage 10 back to the chamber 2 of the pump, and the direction of rotation of the cylinder 36 will be counter-clockwise, as viewed in Figs. 9, 10, and 12, thereby reversing the direction of rotation of the shaft 98 from that in which it revolved when the valve 20 was in the position shown in Figs. 4, 14, and 15.

Any well known means, not shown, may be employed for shifting the valves 20 and 24.

The casing 1 may be of any desired construction. As shown, that part of the casing which contains the cylinder 36 comprises two end plates 99 and 100 and rings 101 held clamped side by side between the end plates 99 and 100 by bolts 102 which extend through the plate 99 and plates or rings 101 and have threaded engagement with the end plate 100.

That portion of the casing 1 in which is located the chamber 2 of the pump, in the structure shown, comprises two end plates 103 and 104 between which is clamped a ring portion 105, which encircles the chamber 2, by bolts 106 which extend through the end plates 103 and 104 and the ring portion 105 and have threaded engagement with the end plate 99.

As shown in Figs. 6 and 10, annular packing rings 107 are provided, in annular grooves for containing them between the ring portions 101 and between the end plates 99 and 100 and the ring portions 101 respectively next thereto.

By disposing the fixed pistons 48, 49, and 50 in different circumferential positions, as shown, power is at all times applied to revolve the cylinder 36 when two or more of the chambers 45, 46, and 47 are in operative connection with the pump.

It will be noted that higher than the lowest speed may be obtained in either direction of rotation of the cylinder 36.

In the specific form shown and described, the pump having the engine driven member 4 rotative in the chamber 2 having the outlet 9 and the inlet 10, constitutes the means for supplying, through the valved passage 8 and its branches, fluid under pressure to each of the cylinder chambers through either of its ports and discharging it through the other port.

Various modifications of my invention, within the scope of the appended claims, may be made without departing from its spirit.

What I claim is:—

1. In a power transmission mechanism, a casing, a cylinder rotative in said casing and having a chamber and two ports communicating with said chamber, a stationary piston disposed eccentrically in said chamber, sealing means comprising a propelling wing carried by said cylinder between said ports and bearing at all times on the periphery of said piston, and means for supplying fluid under pressure to said chamber through one of said ports and discharging it through the other port.

2. In a power transmission mechanism, a casing having two passages, a cylinder rotative in said casing and having a chamber and two ports communicating with said chamber, a stationary piston disposed eccentrically in said chamber, propelling sealing means operative to drive said cylinder in either direction and carried by said cylinder between said ports and bearing at all times on the periphery of said piston, and means for supplying fluid under pressure to said chamber through either of said ports and discharging it through the other port.

3. In a power transmission mechanism, a casing having two passages, a cylinder rotative in said casing and having a chamber and two ports communicating with said chamber and with said passages respectively, a stationary piston disposed eccentrically in said chamber, sealing means comprising a propelling wing carried by said cylinder between said ports and bearing at all times on the periphery of said piston, means for supplying fluid under pressure to said chamber through one of said passages and discharging it through the other passage and means by which said passages may be given direct connection with each other.

4. In a power transmission mechanism, a casing having two passages, a cylinder rotative in said casing and having a chamber and two ports communicating with said chamber and with said passages respectively, a stationary piston disposed eccentrically in said chamber, sealing means comprising a propelling wing carried by said cylinder between said ports and bearing at all times on the periphery of said piston, means for supplying fluid under pressure to said chamber through either of said passages and discharging it through the other passage and means by which said passages may be given direct connection with each other.

5. In a power transmission mechanism, a casing having two passages for fluid, a cylinder rotative in said casing and having a chamber and two ports communicating with said chamber, a stationary piston disposed eccentrically in said chamber, two ducts respectively continuously connecting said ports with said passages and encircling said cylinder between the latter and said casing, and propelling sealing means carried by said cylinder between said ports and bearing at all times on the periphery of said piston.

6. In a power transmission mechanism, a casing having two passages for fluid, a cylinder rotative in said casing and having a chamber and two ports communicating with said chamber, a stationary piston disposed eccentrically in said chamber, two ducts respectively continuously connecting said ports with said passages and encircling said cylinder between the latter and said casing, propelling sealing means carried by said cylinder between said ports and bearing at all times on the periphery of said piston, and means for supplying pressure to said chamber through one of said passages and for discharging it through the other passage.

7. In a power transmission mechanism, a casing having two passages for fluid, a cylinder rotative in said casing and having a chamber and two ports communicating with said chamber, a stationary piston disposed eccentrically in said chamber, two ducts respectively connecting said ports with said passages and encircling said cylinder between the latter and said casing, propelling sealing means carried by said cylinder between said ports and bearing at all times on the periphery of said piston, means for supplying fluid under pressure to one of said passages and for discharging it through the other passage and means by which said passages may be given direct connection with each other.

8. In a power transmission mechanism, a casing having two passages for fluid, a cylinder rotative in said casing and having a chamber and two ports communicating with said chamber, a stationary piston disposed eccentrically in said chamber, two ducts respectively continuously connecting said ports with said passages and encircling said cylinder between the latter and said casing, propelling sealing means carried by said cylinder between said ports and bearing at all times on the periphery of said piston, means for supplying fluid under pressure to either of said passages and for discharging it through the other passage and means by which said passages may be given direct connection with each other.

9. In a power transmission mechanism, a casing having two passages, a cylinder rotative in said casing and having a chamber and two ports communicating with said chamber and with said passages respectively, a stationary piston disposed eccentrically in said chamber, propelling sealing means carried by said cylinder between said ports and bearing at all times on the periphery of said piston, and means for supplying fluid under pressure and including a valve by which the fluid may be supplied to said chamber through one of said ports and discharged through the other port and by which the passages may be directly connected with each other.

10. In a power transmission mechanism, a casing, a cylinder rotative in said casing and having chambers each having two ports, stationary pistons disposed respectively eccentrically in said chambers, a plurality of pairs of wings pivoted to and carried by said cylinder, one pair of said wings being disposed between said ports of each chamber and extending circumferentially in opposite directions, and bearing at all times on the periphery of the adjacent piston, and means for supplying fluid under pressure to each of said chambers through one of the said ports thereof and discharging it through the other port thereof.

11. In a power transmission mechanism, a casing, a cylinder rotative in said casing and having chambers each having two ports, stationary pistons disposed respectively eccentrically in said chambers, propelling sealing means in each of said chambers carried by said cylinder between the ports of the chamber and bearing at all times on the periphery of the adjacent piston, means for supplying fluid under pressure to one of the ports of each of said chambers and discharging it through the other port thereof and means by which said ports of one of said chambers may be directly connected with each other.

12. In a power transmission mechanism, a casing, a cylinder rotative in said casing and having chambers each having two ports, stationary pistons disposed respectively eccentrically in said chambers, propelling sealing means carried by said cylinder in each of said chambers between the ports thereof and bearing at all times on the periphery of the adjacent piston, means for supplying fluid under pressure to each of said chambers through one of the ports and discharging it through the other port thereof and means by which the ports of each of said chambers may be directly connected with each other.

13. In a power transmission mechanism, a casing, a cylinder rotative in said casing and having a plurality of chambers each having two ports, a plurality of stationary pistons respectively eccentrically disposed in said chambers, propelling sealing means in each of said chambers between the ports thereof and bearing at all times on the periphery of the adjacent piston, means for supplying fluid under pressure to each of said chambers through one of the ports and discharging it through the other port thereof and means by which the fluid supply may be shut off from each or all of said chambers and the ports of each disconnected chamber be given direct connection with each other.

14. In a power transmission mechanism, a casing, a cylinder rotative in said casing and having two chambers disposed side by side and having a common axis and each having two ports, two stationary pistons disposed respectively eccentrically in said chambers, four ducts encircling said cylinder between the latter and said casing and respectively communicating with said ports, propelling sealing means carried by said cylinder in each of said chambers between the ports thereof and bearing at all times on the periphery of the adjacent piston, means for supplying fluid under pressure to two of said ducts which are respectively connected to said chambers and for discharging the fluid through the other two of said ducts and means by which the ducts communicating with one of said chambers may be directly connected with each other.

15. In a power transmission mechanism, a pump having an engine driven member and an outlet and an inlet for fluid, a casing, a cylinder rotative in said casing and having a driving member and a plurality of chambers each having two ports communicating therewith, stationary pistons disposed respectively eccentrically in said chambers, propelling sealing means carried by said cylinder in each of said chambers between said ports thereof and bearing at all times on the periphery of the adjacent piston, and means by which the ports of each of said chambers may be directly connected with each other and respectively placed into communication with said outlet and said inlet.

WALTER M. BRALY.